US009009522B2

(12) United States Patent
Kaneko

(10) Patent No.: US 9,009,522 B2
(45) Date of Patent: Apr. 14, 2015

(54) MANAGEMENT SYSTEM, IMAGE FORMING APPARATUS, AND METHOD THEREOF FOR MANAGING AN OPERATION STATE OF THE IMAGE FORMING APPARATUS

(71) Applicant: Canon Kabushiki Kaisha, Tokyo (JP)

(72) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 13/689,522

(22) Filed: Nov. 29, 2012

(65) Prior Publication Data
US 2013/0145221 A1 Jun. 6, 2013

(30) Foreign Application Priority Data

Dec. 1, 2011 (JP) ................................. 2011-263421

(51) Int. Cl.
| G06F 11/00 | (2006.01) |
| H04L 12/24 | (2006.01) |
| G06F 11/30 | (2006.01) |
| G06F 11/07 | (2006.01) |

(52) U.S. Cl.
CPC ............ *H04L 41/12* (2013.01); *G06F 11/3055* (2013.01); *G06F 11/0733* (2013.01); *G06F 11/0748* (2013.01); *G06F 11/0769* (2013.01); *G06F 11/3013* (2013.01); *G06F 11/3086* (2013.01)

(58) Field of Classification Search
USPC .......................................................... 714/4.1
See application file for complete search history.

(56) References Cited

U.S. PATENT DOCUMENTS

| 2005/0281566 A1* | 12/2005 | Kaneko ............................. 399/8 |
| 2009/0037573 A1* | 2/2009 | Qiu et al. ....................... 709/224 |
| 2012/0254652 A1* | 10/2012 | Katiyar et al. ................. 714/4.1 |

FOREIGN PATENT DOCUMENTS

JP        2006-340239 A        12/2006

* cited by examiner

*Primary Examiner* — Jigar Patel
(74) *Attorney, Agent, or Firm* — Canon USA, Inc., IP Division

(57) ABSTRACT

An image forming apparatus according to the present invention includes a request unit configured to transmit a registration confirmation request that includes identification information of the image forming apparatus to the management server in response to an operation by a user for starting a monitoring service with the management server after the image forming apparatus is installed in the client system, an analysis unit configured to analyze a response from the management server to the registration confirmation request, and a storage unit configured to store a retry period included in the response if an analysis result of the response indicates non-registration. The request unit retransmits a registration confirmation request during the stored retry period until a response indicating registration completion is received from the management server.

9 Claims, 16 Drawing Sheets

FIG. 6

| IDENTIFICATION ID | DEV00001 |
|---|---|
| PRODUCT NAME | MFP 1500 |
| MAC ADDRESS | xxxxxx000001 |
| IP ADDRESS | 20.xxx.0.1 |
| USED TONER | CRG-25 |
| CONTRACT START DATE | 2011/09/20 |
| CONTRACT END DATE | 2012/09/20 |
| INSTALLATION LOCATION | XXX BUILDING 3F |
| ⋮ | ⋮ |

FIG. 7

| COUNTRY | RETRY PERIOD (WEEKS) |
|---|---|
| JPN | 2 |
| USA | 4 |
| UK | 1 |
| AUS | 2 |
| Other | 3 |

FIG. 10

```
<Event.Conf>
   <FileVersion>X.X.0</FileVersion>
   <CreateDate>Thu October 7 19:11:00 JST 2010</CreateDate>
     <Error>
        <Code Unit="10">
           <Start>50000</Start>
           <End>59999</End>
        </Code>
        <Code Unit="16">
           <Start>04000000</Start>
           <End>04FFFFFF</End>
        </Code>
     </Error>      <Alarm>
        <Code Unit="16">XX040008</Code>
        <Code Unit="16">XX100001</Code>
        <Code Unit="16">XX100002</Code>
        <Code Unit="16">XX100003</Code>
        <Code Unit="16">XX100004</Code>
        <Code Unit="16">XX010001</Code>
        <Code Unit="16">XX010002</Code>
        <Code Unit="16">XX010003</Code>
        <Code Unit="16">XX010004</Code>
        <Code Unit="16">XX310001</Code>
        <Code Unit="16">XX040010</Code>
     </Alarm>
     <Jam>
        <Code Unit="16">
           <Start>04</Start>
        </Code>
        <Code Unit="10">
           <Start>40030</Start>
        </Code>
        <Code Unit="10">
           <Start>40900</Start>
           <End>40933</End>
        </Code>
     </Jam>
</Event.Conf>
```

FIG. 11

| | |
|---|---|
| VENDOR ID | AAA00 |
| VENDOR NAME | AAA00 Company |
| TIME ZONE | JAPAN |
| ADDRESS | KANAGAWA PREFECTURE xxxx |
| TELEPHONE NUMBER | xxx-xxx-xxxx |
| E-MAIL ADDRESS OF PERSON IN CHARGE | xxx@xx.xx.jp |
| ... | ... |

| IDENTIFICATION ID | DEV00001 |
|---|---|
| PRODUCT NAME | MFP 1500 |
| MAC ADDRESS | xxxxxx000001 |
| IP ADDRESS | 20.xxx.0.1 |
| 1201 — DESTINATION INFORMATION | JAPAN |
| 1202 — FINAL FLAG | 1 |
| ⋮ | ⋮ |

# MANAGEMENT SYSTEM, IMAGE FORMING APPARATUS, AND METHOD THEREOF FOR MANAGING AN OPERATION STATE OF THE IMAGE FORMING APPARATUS

BACKGROUND OF THE INVENTION

1. Field of the Invention

The present invention relates to processing performed in a system configured to monitor and manage an operation state of an image forming apparatus when starting monitoring based on registration of management information about the image forming apparatus in a management server.

2. Description of the Related Art

Conventionally, a service person performs an installation operation of an image forming apparatus in a client system environment, and a confirmation operation regarding whether communication between the installed image forming apparatus and a management server is normal. In view of this situation, Japanese Patent Application Laid-Open No. 2006-340239 discusses a system in which a button for performing a communication test with a management system is provided on an operation panel of an image forming apparatus, and when the communication test is successfully performed by pressing the button, the management and monitoring of the image forming apparatus is started.

In principle, once a contract relating to utilization has been concluded between a vendor and a customer, and the image forming apparatus has been installed in the client system, the apparatus should be able to be used by the client as soon as possible. Moreover, the installed image forming apparatus should transmit the information required for monitoring to the monitoring server so that the monitoring service can be started.

However, to provide an appropriate monitoring service based on the contract, verification between information included in the communication test from the installed image forming apparatus and management information in the management server has to be confirmed. Therefore, it would be desirable to enable the monitoring service to be started by quickly performing a communication test on the image forming apparatus side in conjunction with registration of the management information about the management server.

In addition, recently, in order to reduce the service costs of dispatching a service person, measures are being discussed for reducing the number of call outs of maintenance-dedicated service person by allowing the image forming apparatus delivery and installation company or the client system administrator to easily perform operations such as the above-described installation confirmation.

SUMMARY OF THE INVENTION

The present invention is directed to a system that enables, at an appropriate timing, transmission of information about an image forming apparatus and start of a monitoring service based thereon, while reducing service person call outs.

According to an aspect of the present invention, a management system includes an image forming apparatus installed in a client system and a management server for monitoring the image forming apparatus. The image forming apparatus includes a request unit configured to transmit a registration confirmation request that includes identification information of the image forming apparatus to the management server in response to an operation by a user for starting a monitoring service with the management server after the image forming apparatus is installed in the client system, an analysis unit configured to analyze a response from the management server to the registration confirmation request, a start control unit configured to start transmission of information according to the monitoring service if an analysis result of the response indicates registration completion, a storage unit configured to store a retry period included in the response if an analysis result of the response indicates non-registration, and a transmission unit configured to, if an error occurs in the image forming apparatus, transmit information about the error to the management server. The management server includes a determination unit configured to, if a registration confirmation request is received from the image forming apparatus, determine whether identification information included in the registration confirmation request is registered as management information indicating the image forming apparatus that is to be a target of the monitoring service, and a response unit configured to transmit a response indicating registration completion to the image forming apparatus if it is determined by the determination unit that the registration confirmation request is registered as management information, and if it is determined by the determination unit that the registration confirmation request is not registered as management information, transmit a response that indicates non-registration to the image forming apparatus and includes a retry period. The request unit is configured to retransmit a registration confirmation request during the stored retry period until a response indicating registration completion is received from the management server, and the transmission unit is configured to transmit error information according to an occurrence of a specific error which is apart of the monitoring service, even before a response indicating registration completion is received from the management server.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a table used by a management server to manage information relating to an image forming apparatus.

FIG. 7 is a table used by a management server to manage a retry period for respective destinations.

FIG. 10 illustrates a list of serious errors used in a second exemplary embodiment.

FIG. 11 illustrates management information relating to a vendor.

FIG. 12 illustrates an example of the content of a registration confirmation request according to the present invention.

DESCRIPTION OF THE EMBODIMENTS

Various exemplary embodiments, features, and aspects of the invention will be described in detail below with reference to the drawings.

Figure 1:
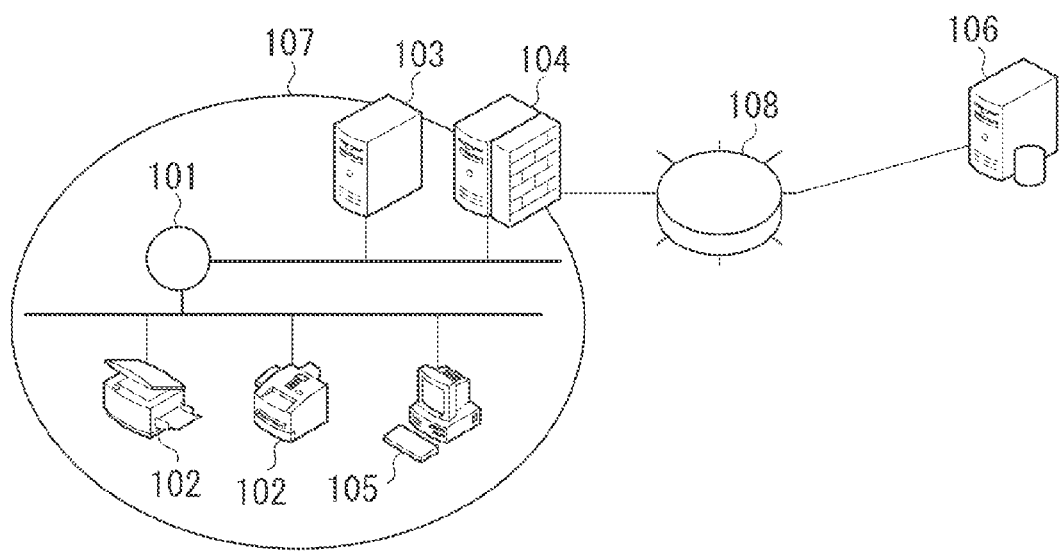
FIG. 1 illustrates a connection relationship between an image forming apparatus and a management server via the Internet.

FIG. 1 illustrates a connection relationship between an image forming apparatus main body and a management server via the Internet according to a first exemplary embodiment of the present invention. In the present invention, a management system is configured so as to include at least an image forming apparatus and a management server.

The system illustrated in FIG. 1 includes a local area network (LAN) 101, an image forming apparatus 102, a proxy server 103, a firewall 104 provided to increase Intranet security, a personal computer (PC) 105, and a management server 106. The image forming apparatus 102 may include (not illustrated) functions such as FAX and copying. The PC 105 is used when a general user issue instructions, such as a print instruction. The above-described units are connected to each other by the local area network (LAN) 101. The management server 106 manages the operational state of the image forming apparatus in an integrated manner. The image forming apparatus 102, the proxy server 103, and the firewall 104 are interconnected via the LAN 101 in an Intranet environment (client system) 107. In actual practice, a plurality of Intranet environments 107 and the management server 106 are interconnected via the Internet 108.

The image forming apparatus 102 performs communication based on its own communication schedule via the LAN 101, and transmits device information (operational information such as a counter value, an operational state log, and error information, and identification information) about the image forming apparatus 102 to the management server 106 via the Internet 108. Examples of the communication method used during this operation include the one using a management information base (MIB) via simple network management protocol (SNMP). A counter value is a value indicating count information, such as the total number of sheets printed by the image forming apparatus, the number of printed sheets for each registered section or user, or the number of times a mounted part has been used.

According to the present exemplary embodiment, although the communication protocol regarding communication to the management server 106 is assumed to be hypertext transfer protocol (HTTP) or HTTP Secure (HTTPS), the present exemplary embodiment is not especially limited to these. For example, in the example illustrated in FIG. 1, the image forming apparatus 102 transmits data to the management server 106 via the proxy server 103 and the firewall 104 utilizing HTTPS.

Figure 2:
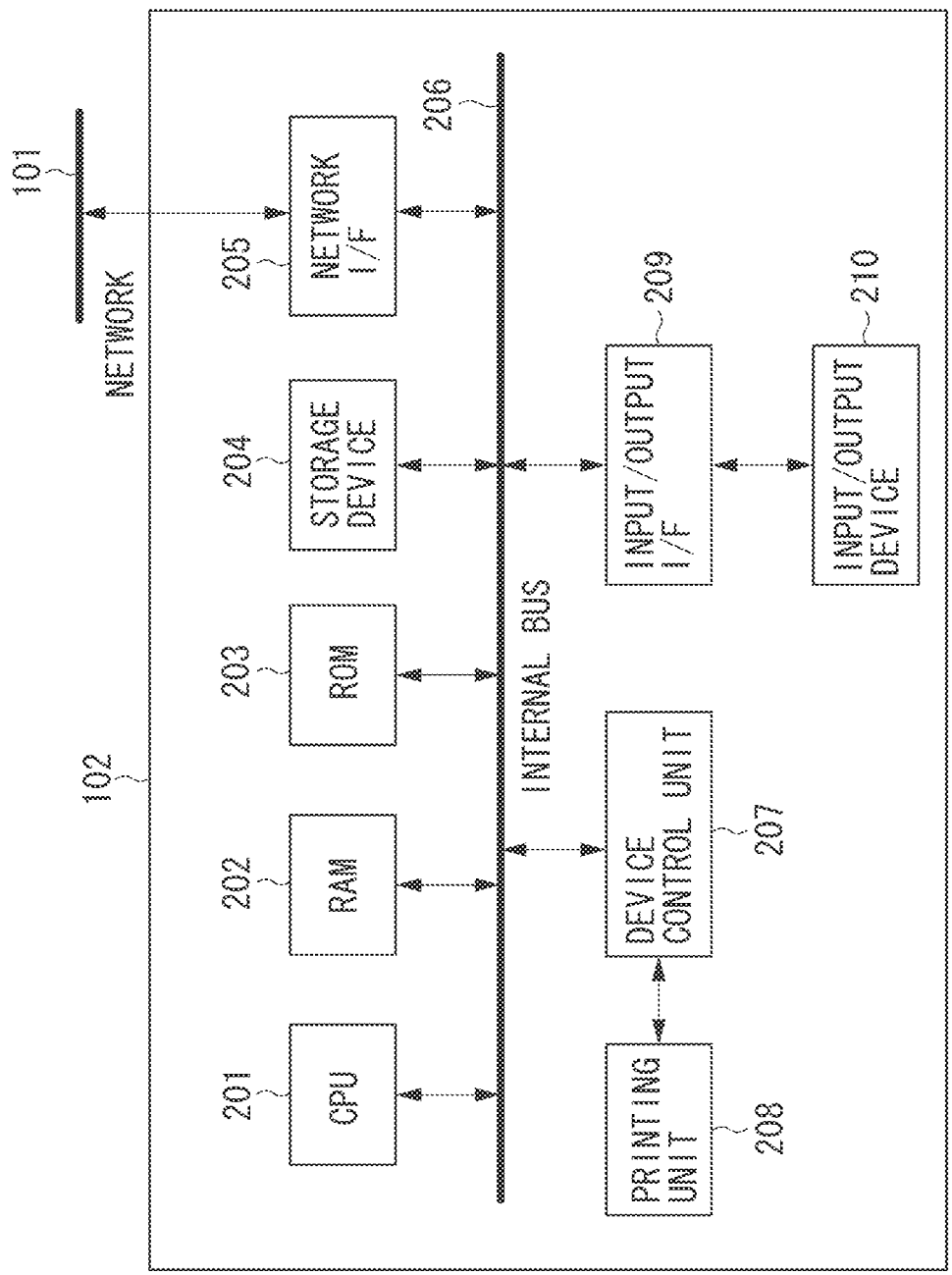
FIG. 2 is a hardware configuration diagram of an image forming apparatus.

FIG. 2 illustrates the configuration of the image forming apparatus 102 according to the exemplary embodiments of the present invention. As the image forming apparatus 102, apparatuses such as a digital multifunction peripheral, a facsimile apparatus, a laser beam printer, an inkjet printer, and a scanner apparatus can be applied in the present invention.

The image forming apparatus 102 includes a central processing unit (CPU) 201, a random access memory (RAM) 202, a read-only memory (ROM) 203, a hard disk device (HDD) 204, a network interface (I/F) 205, an internal bus 206, a device control unit 207, and a printing unit 208 that includes a fixing device and the like.

The CPU 201 executes programs (including programs for realizing the various processes illustrated in below-described FIG. 4) that are stored in the ROM 203. In addition, the CPU 201 entirely controls the respective devices via the internal bus 206. Destination information (e.g., region information about the country where a client system is located) indicating a region where the image forming apparatus 102 is to be shipped is also included in the ROM 203. For example, the language to be displayed by an input/output device 210 is determined based on the destination information. The RAM 202 functions as a memory or a work area of the CPU 201. The network I/F 205 exchanges data in one direction or in both directions with an external network device or a PC via the LAN 101. The device control unit 207 controls the printing unit 208.

The CPU 201 executes the programs along with the RAM 202 and the ROM 203, and performs processing for recording image data on a recording medium, such as the HDD 204. The HDD 204 functions as an external storage device, which in addition to storing image data, can also store the above-described counter information, system information, and monitoring information instead of the backup RAM 202. The input/output device 210 receives inputs (scans, button inputs etc.) from a user, and transmits instructions based on those inputs to the respective processing units via an input/output I/F 209.

Figure 3:
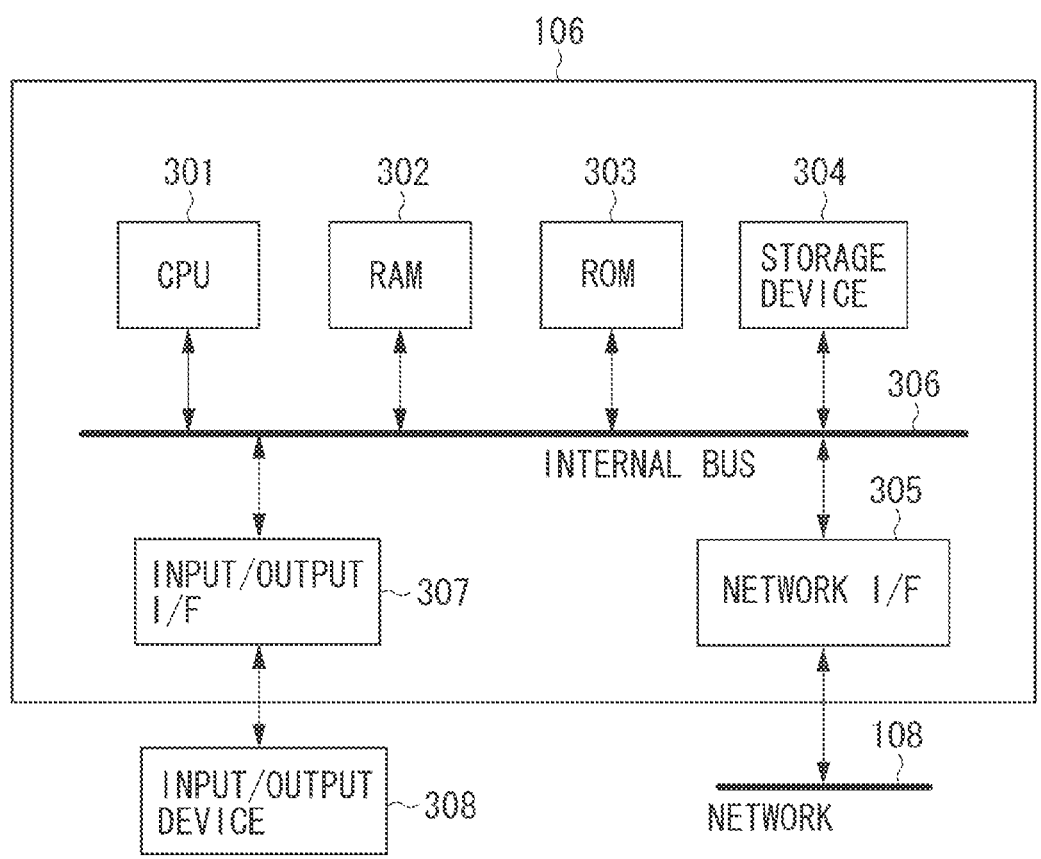
FIG. 3 is a hardware configuration diagram of a management server.

FIG. 3 illustrates the configuration of the management server 106 according to the exemplary embodiments of the present invention. The management server 106 includes a CPU 301 that executes programs (including programs for realizing the various processes illustrated in below-described FIG. 5) that are stored in the ROM 203. In addition, the CPU 301 entirely controls the respective devices via an internal bus 306. A RAM 302, a ROM 303, an HDD 304, a network I/F 305, and an input/output I/F 307 are connected to the internal bus 306.

The input/output I/F 307 includes, for example, a personal system 2 (PS/2) I/F, a universal serial bus (USB) I/F, and an analog or digital display device I/F. An input/output device 308 is a keyboard, a mouse, a cathode ray tube (CRT), a liquid crystal display, or the like, which can be connected to the management server 106 via the input/output I/F 307.

The management server 106 is connected by the network I/F 305 to the Internet 108 via the LAN 101 and the Intranet environment 107, so that the management server 106 can communicate with the image forming apparatus 102 and the PC 105. The CPU 301 executes programs along with the RAM 302 and the ROM 303, and performs processing for recording image data on a recording medium, such as the HDD 304. The HDD 304 functions as an external storage device, which stores management information about the image forming apparatus 102, and can also store system information and processing information instead of the backup RAM 302.

Figure 4:
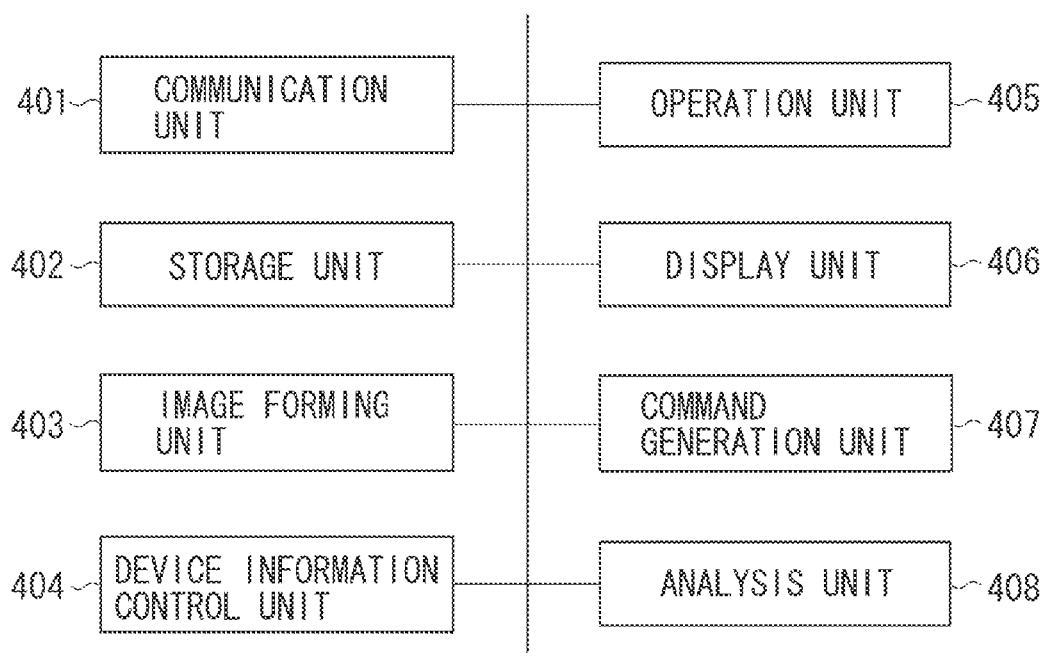
FIG. 4 is a software configuration diagram of an image forming apparatus.

FIG. 4 illustrates a software module configuration of the image forming apparatus 102. When the programs according to the present invention are executed by the CPU in the image forming apparatus 102, the functions of the illustrated modules are realized.

A communication unit 401 controls the transmission of device information relating to the image forming apparatus 102 to the management server 106. Further, the communication unit 401 controls reception of instructions and information transmitted from the management server 106. The transmission and reception is performed using, for example, single mail transfer protocol (SMTP) and HTTP/HTTPS.

A storage unit 402 exchanges information with the storage areas of the RAM 202, the ROM 203, and the storage device 204. The storage unit 402 also controls the storage of data indicating the operation history and various abnormal states of the image forming apparatus 102. Communication information (an internet protocol (IP) address etc.) about the management server 106 managing the image forming apparatus 102 is included in management server information managed by the storage unit 402. A below-described retry period used to retry transmission of a registration confirmation request by the communication unit 401 is stored in a predetermined storage area.

An image forming unit 403 has a function of generating print data and controlling output. A device information control unit 404 manages printing control and the abnormal states of the image forming apparatus 102, and also manages counter information and notification information. Further, the device information control unit 404 performs control relating to tint adjustment, print mode, and settings of other functions. An operation unit 405 is an interface for enabling the image forming apparatus 102 to receive operation instructions, such as a print instruction from a user.

A display unit 406 controls display of appropriate information to the user, for example. Examples of such information include status information and setting information about the image forming apparatus. In addition, the display unit 406 performs display control of various buttons, and detects an instruction from the user when the button is pressed. A command generation unit 407 generates a transmission command for transmitting various information pieces managed by the device information control unit 404 to the management server 106. An analysis unit 408 analyzes response data from the management server 106.

Figure 5:
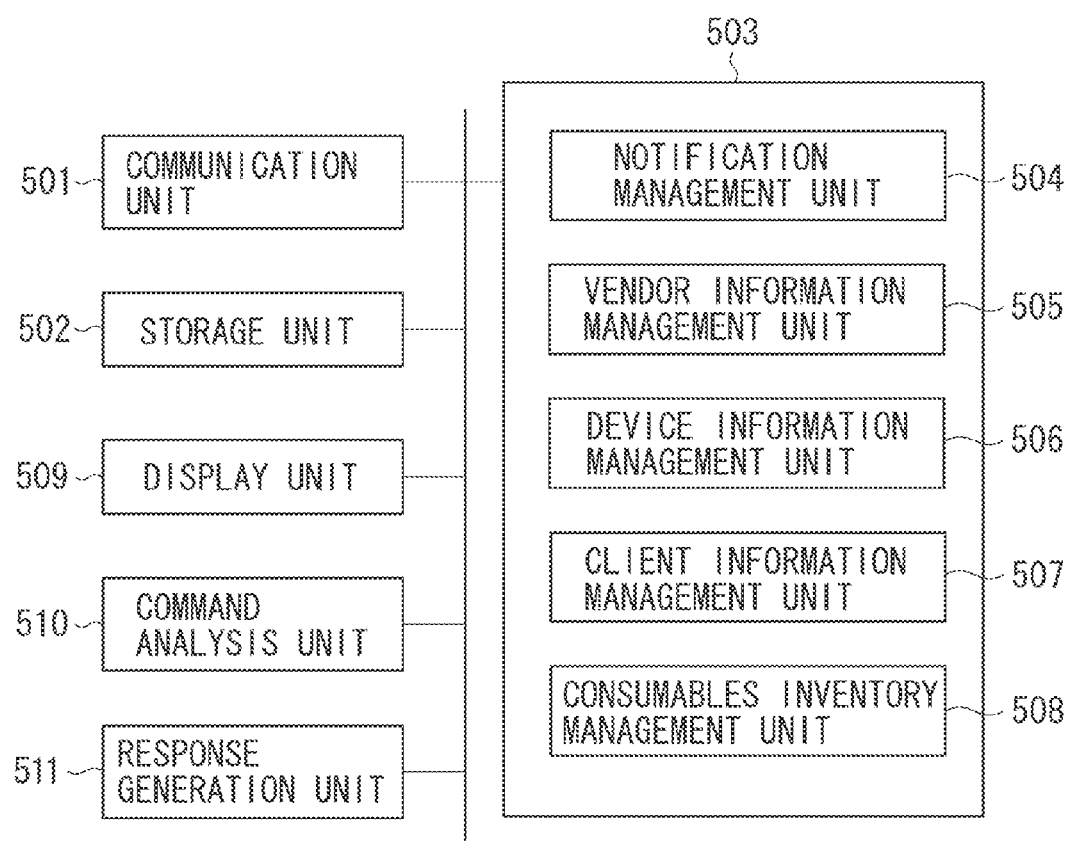
FIG. 5 is a software configuration diagram of a management server.

FIG. 5 illustrates a software module configuration of the management server 106. When the programs according to the present invention are executed by the CPU in the management server 106, the functions of the illustrated modules are realized.

A communication unit 501 has a function of performing communication control with the image forming apparatus 102, for example. More specifically, the communication unit 501 performs reception control of the device information transmitted from the image forming apparatus 102, and transmission control of necessary instruction and information to the image forming apparatus 102.

A storage unit 502 exchanges information with the storage areas of the RAM 302, the ROM 303, and the storage device 304. The storage unit 502 also stores device information about the image forming apparatus to be managed. More specifically, in addition to management information, such as vendor information, client information, identification information about the apparatus, and communication information, the storage unit 502 stores operational information indicating an operational state.

A control unit 503 has a control function of monitoring the image forming apparatus 102 and managing the information necessary for realizing a maintenance operation. The control unit 503 will be described below in terms of its separate function modules, such as a vendor information management unit 505, a device information management unit 506, and a client information management unit 507.

A notification management unit 504 generates notification information and designates a notification destination based on the state of the image forming apparatus, and generates notification data. Examples of the notifications include a maintenance request notification to the service person who maintains the image forming apparatus 102 and a replenishment request notification of consumables. Examples of consumables in the image forming apparatus include toner/ink cartridges and replaceable component units.

The vendor information management unit 505 manages information about a company responsible for management and support of the image forming apparatus 102 installed in the client system. The device information management unit 506 manages various information pieces about the image forming apparatus 102 to be maintained. The device information management unit 506 manages, as a management target, identification information (a serial number or model information) for identifying an image forming apparatus, maintenance history, information about an administrator of the image forming apparatus, consumables management information about the image forming apparatus, and operational information transmitted from the image forming apparatus.

The client information management unit 507 manages information about the client using the image forming apparatus 102. Among the client information is included information relating to a maintenance contract with the vendor. A consumables inventory management unit 508 manages the inventory of consumables such as toner/ink and parts. More specifically, the consumables inventory management unit 508 reduces the inventory stored by the client based on information indicating a toner/ink remaining amount and information indicating parts replacement transmitted from the image forming apparatus 102, and issues a delivery request for a consumable item in cooperation with the notification management unit 504 when an inventory level is below a set threshold, for example.

A display unit 509 displays device information stored in the storage unit 502 as a Web screen. A World Wide Web (WWW) server program is running in the management server 106. Consequently, a service person from the vendor can view the above-described information using a Web browser on a PC. A command analysis unit 510 analyzes a command transmitted from the image forming apparatus 102. An analyzed result is reflected in the storage unit 502, the control unit 503, and the display unit 509. A response generation unit 511 generates a response to the image forming apparatus 102 regarding the command analyzed by the command analysis unit 510.

FIG. 6 illustrates an example of registered management information relating to the image forming apparatus 102 that is stored by the management server 106. The information is stored in the storage unit 304 of the management server 106, and is handled by the device information management unit 506. Such management information is registered in the management server 106 for all image forming apparatuses whose operational information is to be collected and managed, or which are to be maintained.

The table in FIG. 6 includes various registration management information items in a column 601, such as image forming apparatus identification ID, a product name, a media access control (MAC) address, an IP address, and the like, and actual data 602 corresponding to these items for the image forming apparatus. Information obtained based on the initial communication from the image forming apparatus 102 is registered as part of the actual data.

FIG. 7 illustrates an example of retry period information for respective countries stored by the management server 106. The information is stored in the storage device 304 of the management server 106, handled by a response generation unit 511, and included in a below-described response to a registration confirmation request from the image forming apparatus 102. A registration confirmation request transmission interval (every 24 hours etc.) during the retry period may also be managed and included with a response to the image forming apparatus 102.

In order for the vendor to start an operation of the monitoring service of the image forming apparatus 102, the management information illustrated in FIG. 6 about the image forming apparatus 102 needs to be registered in the management server 106. It is desirable for the vendor in each country to flexibly perform the installation of the image forming apparatus 102 in the client system and the series of procedures relating to registration of the management information in the management server 106. Therefore, the system is configured so that the vendor in each country can set differently the below-described retry period for the registration confirmation request performed by the image forming apparatus 102.

An example of a series of procedures that is different for vendors in each country is the installation operation. Some vendors may perform the installation operation in the client system within a few days after the registration of the management information in the management server 106. Whereas, other vendors may perform the installation operation in the client system before registering the management information in the management server 106. This is because a different operation is required depending on the situation of the client system that is to be installed and the region where the client system is located.

"Start of the operation of the monitoring service" means to transmit all the operational information pieces about the image forming apparatus to the management server 106, and start arranging the automatic maintenance of the image forming apparatus utilizing the operational information by the management server 106, the automatic delivery of consumables, and the usage status response service.

Figure 8:
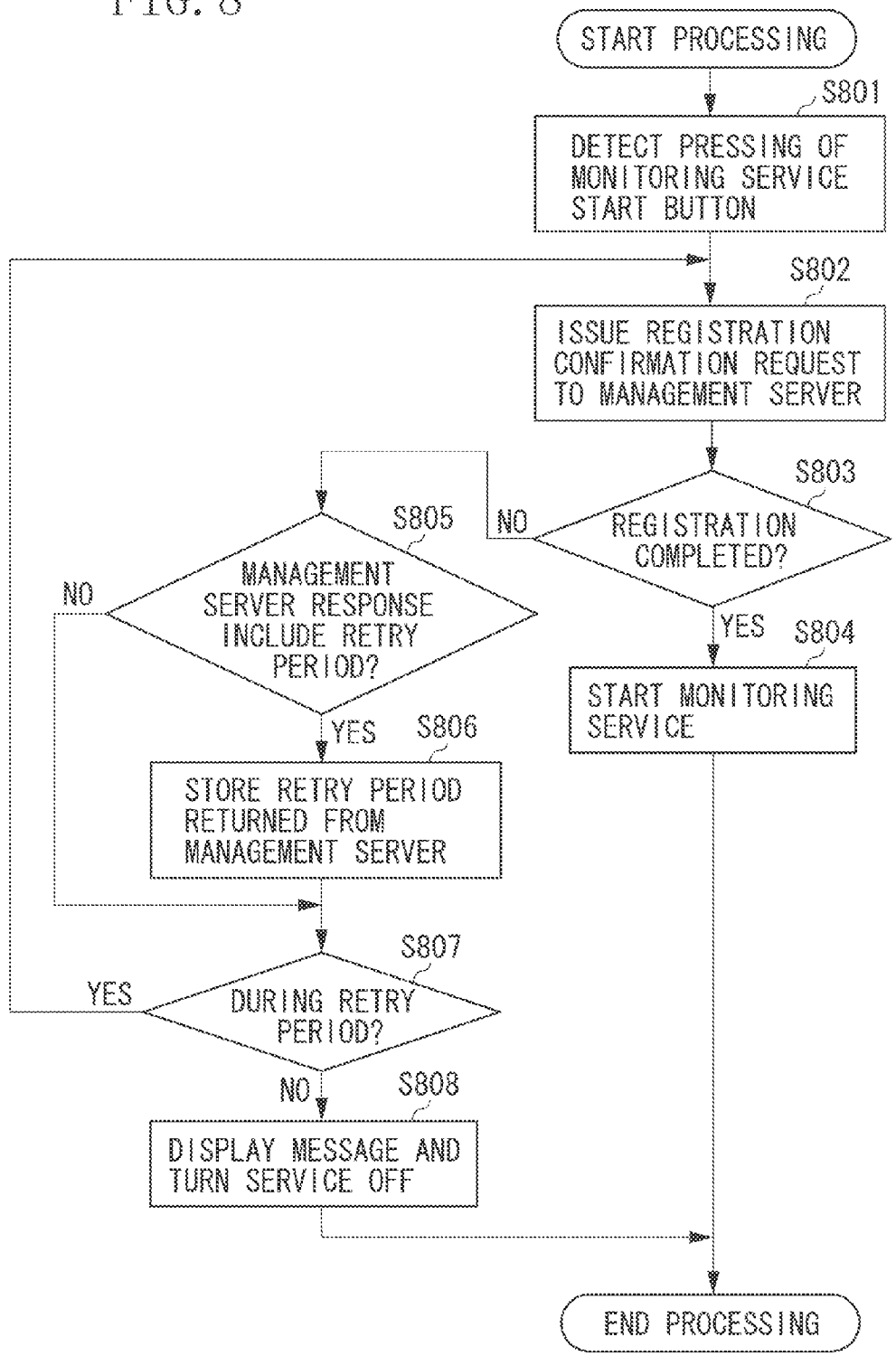
FIG. 8 is a flowchart illustrating processing performed by an image forming apparatus according to a first exemplary embodiment.

FIG. 8 is an example of a flowchart illustrating processing performed by the image forming apparatus 102 to start a monitoring service by issuing a registration confirmation request to the management server 106 based on the press of a button. The registration confirmation request is issued by an installation company or a client administrator when an image forming apparatus is installed in a client system. The program relating to the processing illustrated in the flowchart is stored in the ROM of the image forming apparatus, loaded into the RAM, and executed by the CPU.

In step S801, the image forming apparatus 102 detects that a monitoring service start button is pressed. The monitoring service start button is displayed on an operation panel, which is an example of the input/output device 210, in the image forming apparatus 102. The operation performed on the panel will be described below with reference to FIG. 15.

In step S802, the image forming apparatus 102 issues a registration confirmation request to the management server 106 to confirm whether its own management information is registered therein.

FIG. 12 illustrates an example of the contents of a registration confirmation request. The registration confirmation request is generated by the command generation unit 407 in the image forming apparatus 102, and is transmitted to the management server 106 by the communication unit 401. The registration confirmation request includes, in addition to a product ID and a product name, a MAC address and an IP address.

The registration confirmation request further includes destination information 1201 and a final flag 1202. The destination information 1201 indicates the region where the image forming apparatus 102 is to be installed. The destination information 1201 is stored in the RAM 202 of the image forming apparatus 102 and set at the time of shipment from the factory. The final flag 1202 indicates whether a registration confirmation request to the management server 106 from the image forming apparatus 102 is the final response for a below-described retry period.

In step S803, the image forming apparatus 102 analyzes a response indicating the result of the registration confirmation request returned from the management server 106. If the analysis result in step S803 indicates that registration has been completed (that its own information has been registered in the management server 106) (YES in step S803), the processing proceeds to step S804. If the analysis result indicates that registration has not been completed (NO in step S803), the processing proceeds to step S805.

In step S804, the image forming apparatus 102 starts the monitoring service, and then ends the processing illustrated in the flowchart. Consequently, a post-installation initial setting based on the contact is completed, and the monitoring service is started based on the transmission information (operational information etc.) about the image forming apparatus to the management server 106. If the analysis result of the registration confirmation request in step S803 indicates that registration has been completed (YES in step S803), this means that the installation operation of the image forming apparatus in the client system was performed after registration of the management information in the management server 106 by the vendor.

On the other hand, in step S805, the image forming apparatus 102 analyzes whether the response from the management server 106 includes a retry period. If the analysis result in step S805 indicates that the response from the management server 106 includes a retry period (YES in step S805), the processing proceeds to step S806. Whereas if not, (NO in step S805), the processing proceeds to step S807.

In step S806, the image forming apparatus 102 stores the acquired retry period. The retry period returned from the management server 106 is as illustrated in FIG. 7. If the response from the management server 106 does not include a retry period, this means that the retry period designated from the management server 106 is stored by the image forming apparatus 102.

In step S807, the image forming apparatus 102 confirms whether the present time is during the retry period of the registration confirmation request. If the confirmation result indicates that the present time is during the retry period (YES in step S807), the processing returns to step S802, and the image forming apparatus 102 again issues a registration confirmation request.

Figure 16:
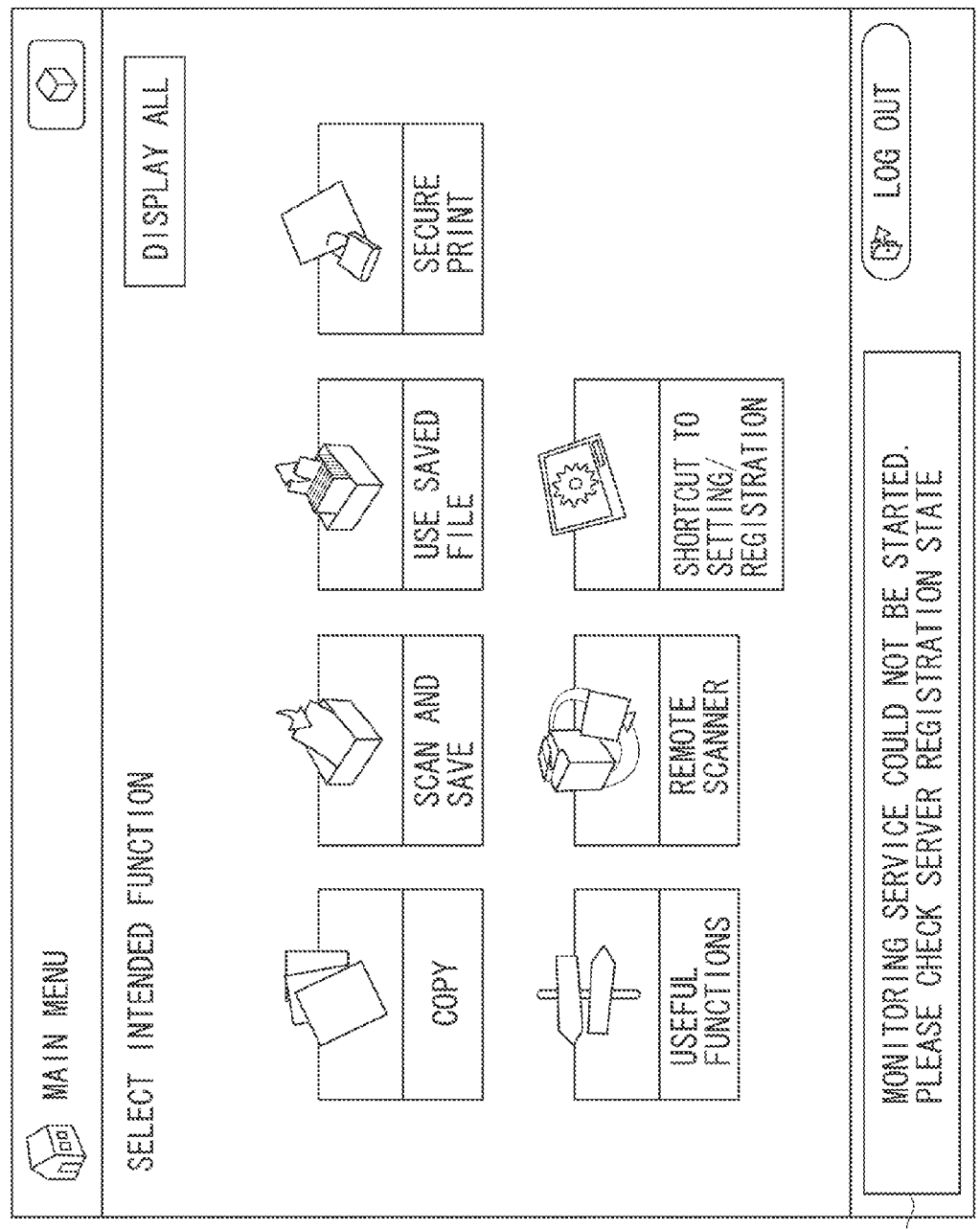
FIG. 16 illustrates an example of an operation screen when the monitoring service failed to start up.

On the other hand, if the present time is not during the retry period (NO in step S807), the processing proceeds to step S808. In step S808, the image forming apparatus 102 displays a message on the operation panel indicating that registration on the management server 106 side is not completed (FIG. 16). By seeing the message, the user recognizes that it is necessary to again perform the operation to issue a registration confirmation request. Simultaneously with the display, the image forming apparatus 102 turns off the present service (i.e., the function relating to the series of processes for starting the monitoring service), which automatically issues a registration confirmation request, and ends the processing illustrated in the flowchart.

Figure 9:
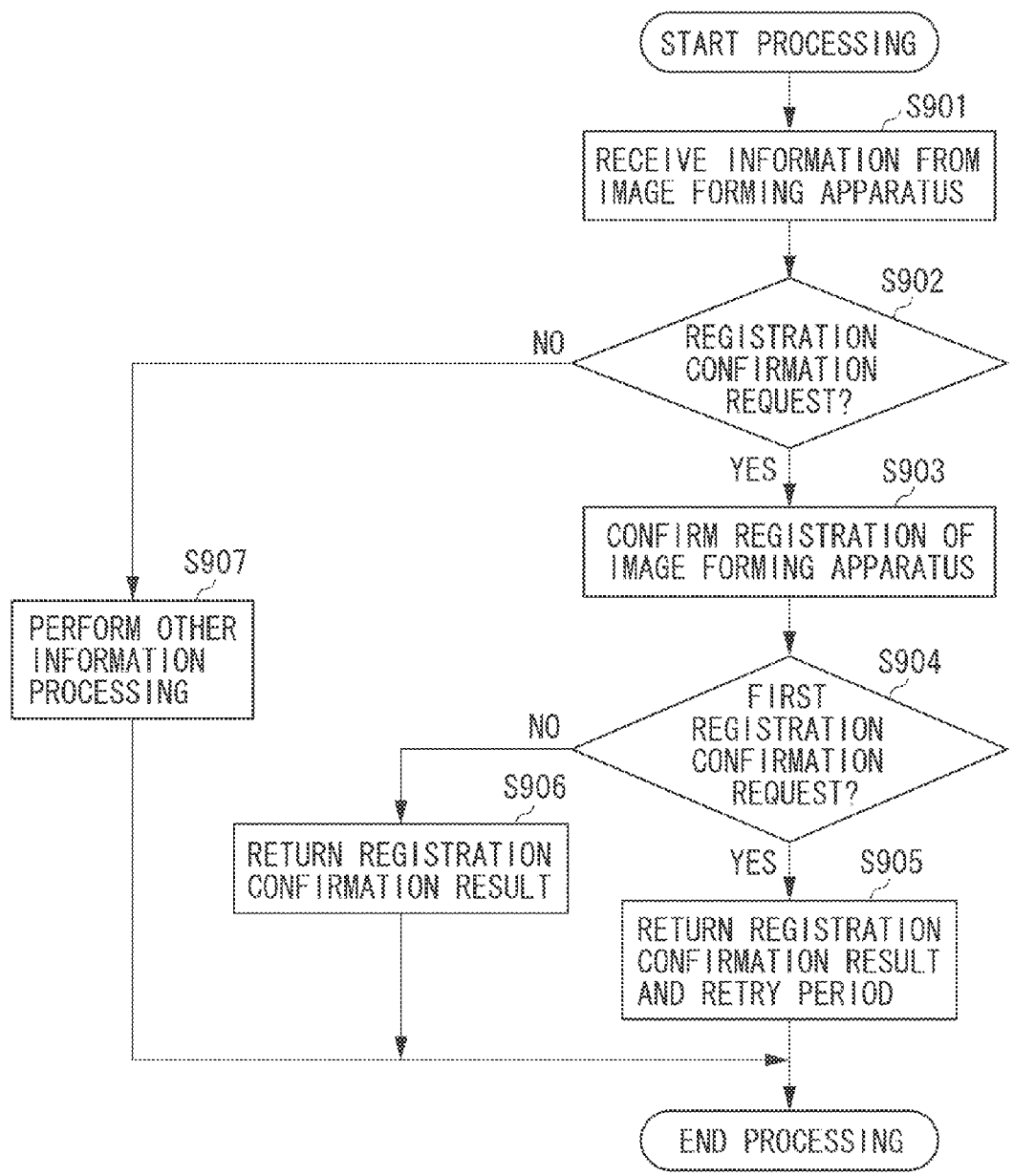
FIG. 9 is a flowchart illustrating registration confirmation processing performed by a management server according to the first exemplary embodiment.

FIG. 9 is an example of a flowchart illustrating registration confirmation processing performed by the management server 106 when a registration confirmation request from the image forming apparatus 102 is received. The program relating to the processing illustrated in the flowchart is stored in the ROM of the image forming apparatus, loaded into the RAM, and executed by the CPU.

In step S901, the management server 106 receives information transmitted from the image forming apparatus 102. In step S902, the management server 106 determines whether the information received in step S901 is a registration confirmation request. If it is determined that the information is a registration confirmation request from the image forming apparatus 102 (YES in step S902), the processing proceeds to step S903. If not (NO in step S902), the processing proceeds to step S907. Instep S907, the management server 106 performs various types of information processing based on the information received from the image forming apparatus 102. A detailed description of the processing in step S907 will not be given here.

In step S903, the management server 106 confirms whether the management information about the image forming apparatus 102, which is the source of the registration confirmation request, is registered as in the table illustrated in FIG. 6. More specifically, information for identifying the image forming apparatus 102, such as an identification ID, is included in the registration confirmation request, as illustrated in FIG. 12. By comparing the information with the management information about the image forming apparatus 102 registered in the management server 106 (FIG. 6), the management server 106 determines whether management information about the image forming apparatus 102, which is the source of the registration confirmation request, is registered in the management server 106.

In step S904, the management server 106 confirms whether the request from the image forming apparatus 102 is the first registration confirmation request. If it is confirmed that the request from the image forming apparatus 102 is the first registration confirmation request (YES in step S904), the processing proceeds to step S905. In step S905, the management server 106 returns the registration confirmation result and the retry period to the image forming apparatus 102, and ends the processing illustrated in the flowchart. The retry period is as described above with reference to FIG. 7. If it is confirmed that the request from the image forming apparatus 102 is not the first registration confirmation request (NO in step S904), the processing proceeds to step S906. In step S906, the management server 106 returns the registration confirmation result to the image forming apparatus 102, and ends the processing illustrated in the flowchart.

In steps S905 and S906, if a response indicating that registration has finished (completed) is returned, the monitoring service of the image forming apparatus 102 will be started. More specifically, a periodic transmission schedule of counter information and a list of error information to be notified are transmitted to the image forming apparatus, and the initial setting for transmitting the information required for maintenance and reporting is reflected in the image forming apparatus.

Figure 15:
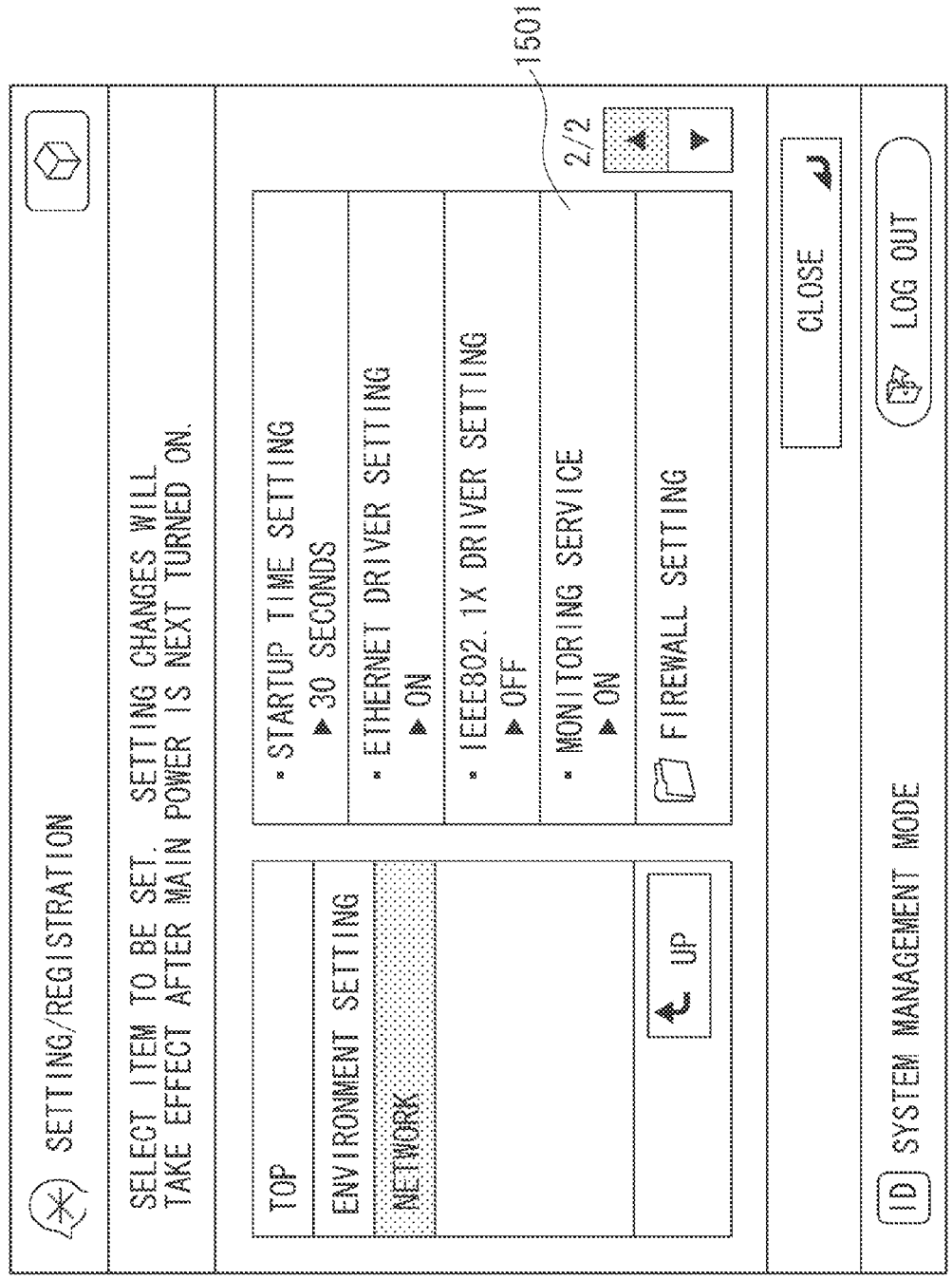
FIG. 15 illustrates an example of an operation screen for starting a monitoring service.

FIG. 15 illustrates an example of a display on the input/output device 210 in the image forming apparatus 102 according to the present invention. The display of information on the input/output device 210 is controlled by the display unit 406.

The image forming apparatus 102 starts the processing relating to the registration confirmation request (FIG. 8) when a user switches the setting of a monitoring service start button 1501 illustrated in FIG. 15 from OFF to ON. Once the monitoring service is switched ON, the image forming apparatus 102 ignores cases when the button is again pressed while the image forming apparatus 102 is confirming registration with the management server 106 (during the retry period). As described above, after the retry period, the display relating to the monitoring service function is changed to OFF, and a message is displayed indicating that the monitoring service could not be started as illustrated in a message box 1601 in FIG. 16. Thus, an administrator of the client system may check the message illustrated in FIG. 16, and again operate the monitoring service start button based on the display illustrated in FIG. 15.

According to the configuration of the present exemplary embodiment, the installation company or the client administrator of the image forming apparatus can easily execute start processing for a registration confirmation request without a service person in charge of restoration work, such as apparatus errors, having to visit the client. Further, the image forming apparatus 102 monitoring service can be started based on the registration of management information in the management server 106 without dispatching a service person.

In a second exemplary embodiment, processing will be described for a case when a part of a monitoring service is started even before management information about an image forming apparatus 102 is registered in a management server 106.

More specifically, even if registration confirmation has not been completed at the timing of installation of an image forming apparatus in a client environment, it is necessary to perform a restoration operation if a serious error occurs in the image forming apparatus in an operation that provisionally allows the client to use the image forming apparatus. Consequently, a case will be considered in which, although some part of the monitoring service, such as reporting, is not started, the monitoring service such as the monitoring of some error information (service calls etc.) and service person call out are started without waiting for completion of the registration confirmation.

FIG. 10 is an example of a list of error codes of monitoring targets stored in the image forming apparatus 102. The error code list is a list of important information to be transmitted by the image forming apparatus 102 to the management server 106 even before completion of registration confirmation based on a registration confirmation request. Basically, the error code list illustrated in FIG. 10 is separate from the code list of error information specified by the management server 106 for the image forming apparatus 102 after completion of registration confirmation. The list illustrated in FIG. 10 is stored in the storage unit 402 of the image forming apparatus 102. Based on the list, the communication unit 401 in the image forming apparatus 102 controls the transmission to the management server 106 of important errors that prevent the image forming apparatus 102 from operating, for example, even before completion of registration confirmation by the management server 106. In addition, since the various setting values at the time of installation of the image forming apparatus and status information are also necessary for maintenance, the communication unit 401 transmits such information to the management server 106 when an error occurs.

FIG. 11 illustrates an example of an information table relating to a vendor stored in the management server 106. The table is stored in the storage device 304 of the management server 106, and is handled by the storage unit 502, the vendor information management unit 505, and the display unit 509.

A time zone 1101 in the table indicates a time zone, namely a region where the vender belongs. The management server 106 may determine a time difference, for example, based on the time zone 1101. An e-mail address 1102 of the person in charge from the vendor is the destination for sending notifications, such as an error notification and consumables (toner/ink, parts, etc.) life notification, of information necessary for support of the client's image forming apparatus 102.

Figure 13:
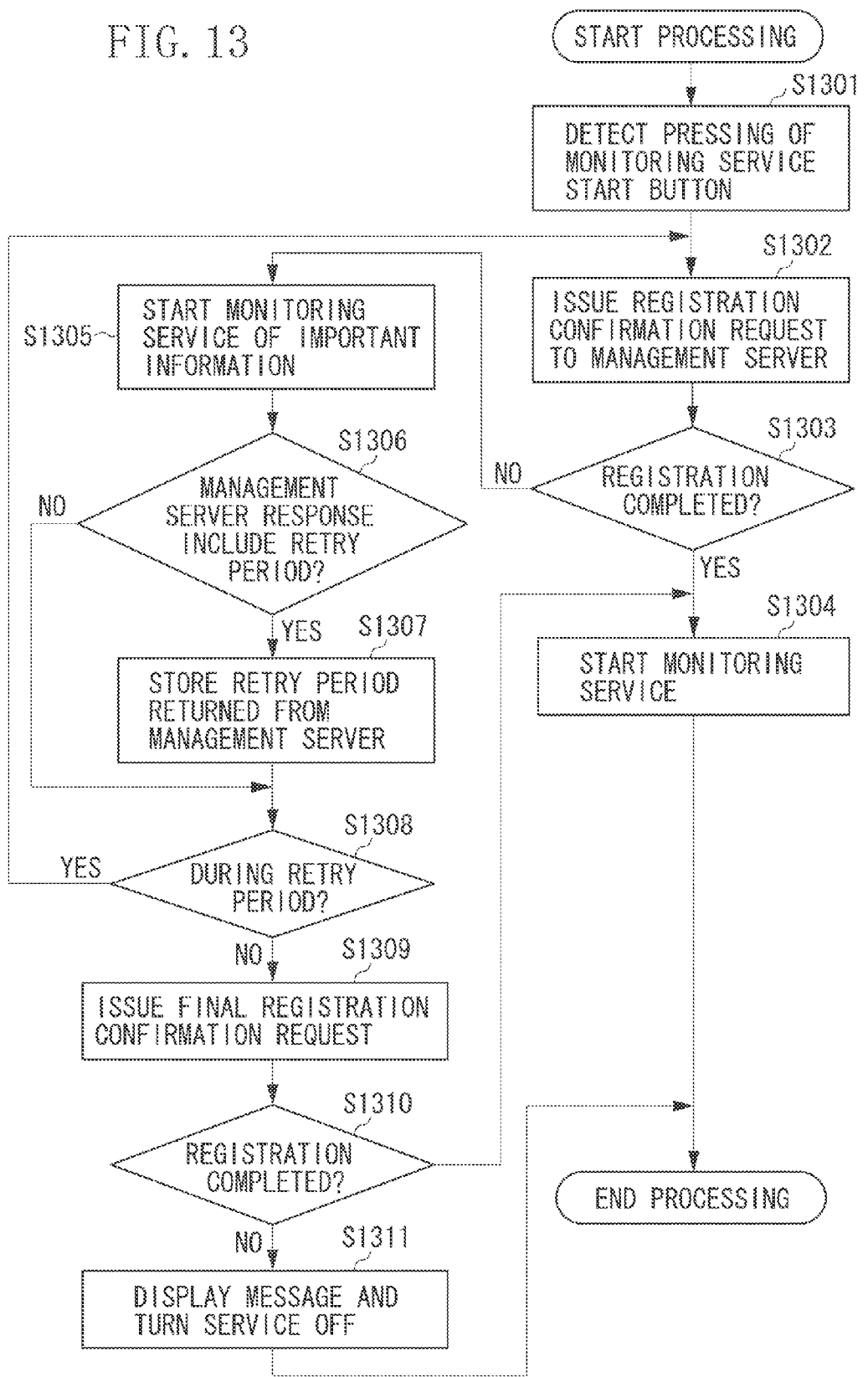
FIG. 13 is a flowchart illustrating processing performed by an image forming apparatus according to a second exemplary embodiment.

FIG. 13 is an example of a flowchart illustrating processing performed by the image forming apparatus 102 to start a monitoring service by issuing a registration confirmation request to the management server 106 based on the press of a button according to the second exemplary embodiment. Since the processing performed in steps S1301 to S1304 and S1306 to S1308 is the same as the processing performed in steps S801 to S804 and S806 to S807, a detailed description of the steps is omitted here.

In step S1305, a monitoring service is started only for important information (the list of serious errors in FIG. 10). More specifically, the communication unit 401 starts control of transmission to the management server 106 based on the occurrence of a serious error. On the other hand, since registration confirmation is not finished at this stage, other monitoring services such as a consumables delivery service and a reposting service are not started.

In step S1308, if it is confirmed that the present time is not during the retry period of the registration confirmation request (NO in step S1308), the processing proceeds to step S1309. In step S1309, the image forming apparatus 102 issues a final registration confirmation request. More specifically, the image forming apparatus 102 issues a registration confirmation request that includes information indicating that the request is retransmission of a final registration confirmation request for the retry period using the flag 1202 illustrated in FIG. 12.

In step S1310, the image forming apparatus 102 analyzes a response indicating the result of the registration confirmation request returned from the management server 106. If the analysis result indicates that the information about the image forming apparatus 102 has been registered in the management server 106 (YES in step S1310), the processing proceeds to step S1304. If the information about the image forming apparatus 102 has not been registered (NO in step S1310), the processing proceeds to step S1311.

In step S1311, the image forming apparatus 102 displays a message on the operation panel indicating that registration on the management server 106 side is not completed (FIG. 16). Simultaneously with the display, the image forming apparatus 102 turns off the present service (i.e., the function relating to the series of processes for starting the monitoring service), which automatically issues a registration confirmation request, and ends the processing illustrated in the flowchart.

Figure 14:
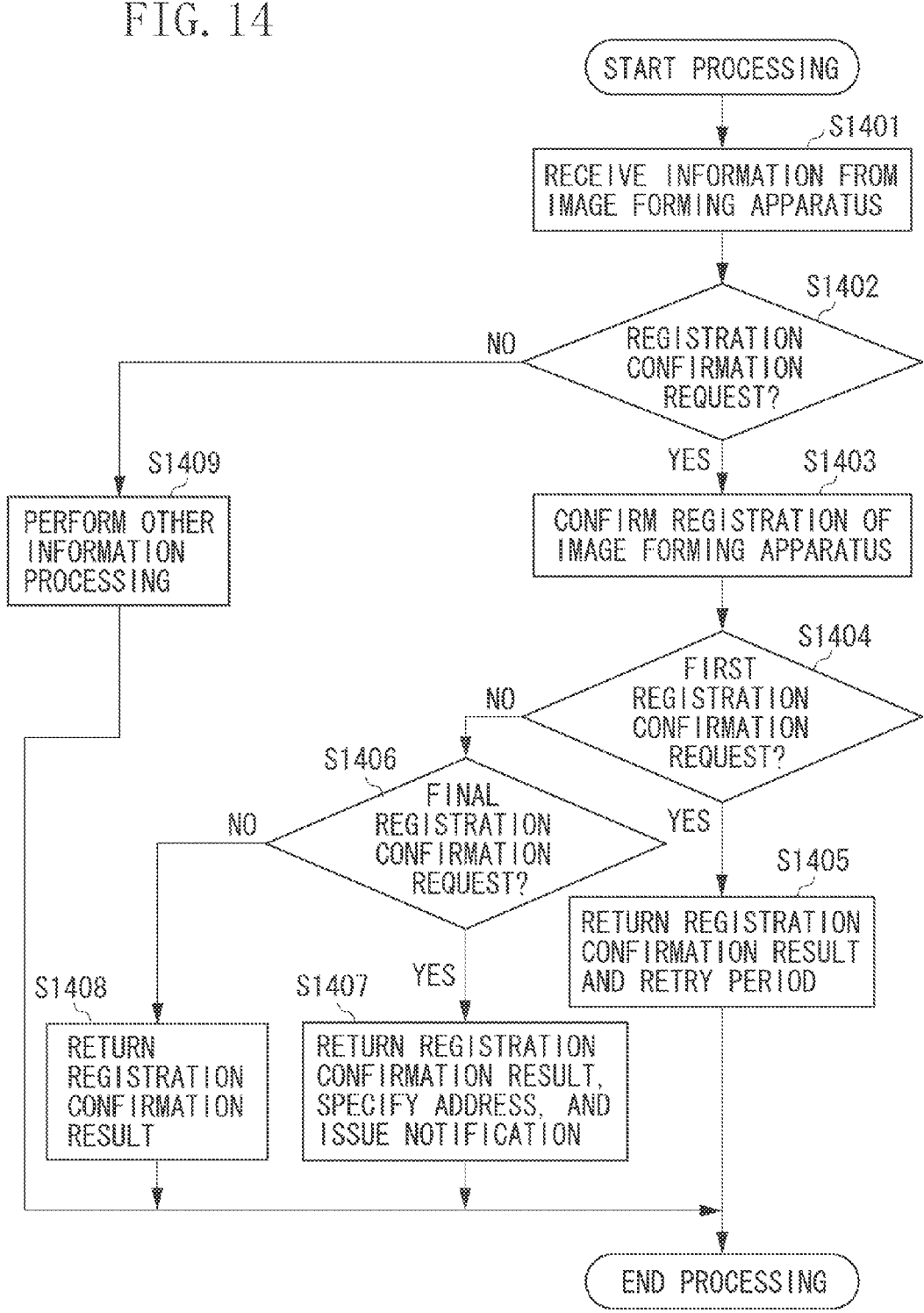
FIG. 14 is a flowchart illustrating registration confirmation processing performed by a management server according to the second exemplary embodiment.

FIG. 14 is an example of a flowchart illustrating registration confirmation processing performed by the management server 106 when a registration confirmation request from the image forming apparatus 102 is received. Since the processing performed in steps S1401 to S1405 and S1409 is the same as the processing performed in steps S901 to S905 and S907, a detailed description of the steps is omitted here.

In step S1404, if it is confirmed that the request from the image forming apparatus 102 is not the first registration confirmation request (NO in step S1404), the processing proceeds to step S1406. In step S1406, the management server 106 determines whether the final registration confirmation request is received from the image forming apparatus 102. The determination in step S1406 is performed based on the flag 1202.

If it is confirmed that the request is the final registration confirmation request (YES in step S1406), the processing proceeds to step S1407, and if not (NO in step S1406), the processing proceeds to step S1408. In step S1408, the management server 106 returns the registration confirmation result to the image forming apparatus 102, and ends the processing illustrated in the flowchart.

In step S1407, the management server 106 returns the registration confirmation result to the image forming apparatus 102. Further, the management server 106 notifies the vendor in charge, by e-mail or the like, of a delay in registration of the management information about the image forming apparatus 102 in the management server 106. The address of the vendor in charge is specified based on the destination information 1201 included in the registration confirmation request transmitted from the image forming apparatus 102 and the time zone 1101 included in the vendor information (FIG. 11) stored by the management server 106. Regarding specification of the address, in addition to determining the address based on destination information about the image forming apparatus 102, the address may be determined by causing the company installing the image forming apparatus 102 to input information for specifying the address of the vendor in charge via the operation panel (input/output device 210) at the time of installation. Examples of information for specifying the address include an ID of the vendor managing the image forming apparatus, a country code, and the e-mail address of the person in charge.

In steps S1405, S1407, and S1408, if a response indicating that registration has finished (completed) is returned, the monitoring services other than the serious error monitoring services of the image forming apparatus 102 are also started.

According to the present exemplary embodiment, even if registration of management information in the management server 106 is delayed, a serious error that has occurred when the client provisionally used the image forming apparatus 102 is transmitted to the management server 106. Therefore, some of the maintenance services, such as a restoration operation for that error, can be provided. In addition, a delay in registration of the management information can be notified to the appropriate person in charge via e-mail.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-263421 filed Dec. 1, 2011, which is hereby incorporated by reference herein in its entirety.

What is claimed is:

1. A management system comprising an image forming apparatus installed in a client system and a management server for monitoring the image forming apparatus,
wherein the image forming apparatus comprises:
a request unit configured to transmit a registration confirmation request that includes identification information of the image forming apparatus to the management server in response to an operation by a user for starting a monitoring service with the management server after the image forming apparatus is installed in the client system;

an analysis unit configured to analyze a response from the management server to the registration confirmation request;

a start control unit configured to start transmission of information according to the monitoring service if an analysis result of the response indicates registration completion;

a storage unit configured to store a retry period included in the response if an analysis result of the response indicates non-registration; and a transmission unit configured to, if an error occurs in the image forming apparatus, transmit information about the error to the management server, wherein the management server comprises:

a determination unit configured to, if a registration confirmation request is received from the image forming apparatus, determine whether identification information included in the registration confirmation request is registered as management information indicating the image forming apparatus that is to be a target of the monitoring service; and a response unit configured to transmit a response indicating registration completion to the image forming apparatus if it is determined by the determination unit that the registration confirmation request is registered as management information, and if it is determined by the determination unit that the registration confirmation request is not registered as management information, transmit a response that indicates non-registration to the image forming apparatus and includes a retry period, wherein the request unit is configured to retransmit a registration confirmation request during the stored retry period until a response indicating registration completion is received from the management server, and wherein the transmission unit is configured to transmit error information according to an occurrence of a specific error which is a part of the monitoring service, even before a response indicating registration completion is received from the management server.

2. The management system according to claim 1, wherein the management server further comprises a notification unit configured to, if a registration confirmation request from the image forming apparatus includes information indicating that the registration confirmation request is a final request for the retry period and destination information, notify an address specified from the destination information of a delay in registration of management information about the image forming apparatus.

3. A method executed in a management system comprising an image forming apparatus installed in a client system and a management server for monitoring the image forming apparatus, the method comprising:

transmitting, via the image forming apparatus, a registration confirmation request that includes identification information of the image forming apparatus to the management server in response to an operation by a user for starting a monitoring service with the management server after the image forming apparatus is installed in the client system;

analyzing, via the image forming apparatus, a response from the management server to the registration confirmation request;

starting, via the image forming apparatus, transmission of information according to the monitoring service if an analysis result of the response indicates registration completion;

storing, via the image forming apparatus, a retry period included in the response if an analysis result of the response indicates non-registration;

transmitting, via the image forming apparatus, information about the error to the management server, if an error occurs in the image forming apparatus;

determining, via the management server, if a registration confirmation request is received from the image forming apparatus, whether identification information included in the registration confirmation request is registered as management information indicating the image forming apparatus that is to be a target of the monitoring service;

transmitting, via the management server, a response indicating registration completion to the image forming apparatus if it is determined that the registration confirmation request is registered as management information, and if it is determined that the registration confirmation request is not registered as management information, transmitting a response that indicates non-registration to the image forming apparatus and includes a retry period;

retransmitting, via the image forming apparatus, a registration confirmation request during the stored retry period until a response indicating registration completion is received from the management server; and transmitting, via the image forming apparatus, error information according to an occurrence of a specific error which is a part of the monitoring service, even before a response indicating registration completion is received from the management server.

4. An image forming apparatus installed in a client system that is configured to communicate with a management server, the image forming apparatus comprising:

a request unit configured to transmit a registration confirmation request that includes identification information of the image forming apparatus to the management server in response to an operation by a user for starting a monitoring service with the management server after the image forming apparatus is installed in the client system;

an analysis unit configured to analyze a response from the management server to the registration confirmation request;

a start control unit configured to start transmission of information according to the monitoring service if an analysis result of the response indicates registration completion; and a storage unit configured to store a retry period included in the response if an analysis result of the response indicates non-registration, wherein the request unit is configured to retransmit a registration confirmation request during the stored retry period until a response indicating registration completion is received from the management server.

5. The image forming apparatus according to claim 4, further comprising a transmission unit configured to, if an error occurs in the image forming apparatus, transmit information about the error to the management server, wherein the transmission unit is configured to transmit error information according to an occurrence of a specific error which is a part of the monitoring service, even before a response indicating registration completion is received from the management server.

6. The image forming apparatus according to claim 4, wherein if a final registration confirmation request for the retry period is retransmitted by the request unit, the registration confirmation request includes information indicating that the registration confirmation request is a final request for the retry period and destination information.

7. The image forming apparatus according to claim 4, further comprising a display unit configured to, if the retry period elapses before a response indicating registration completion is received from the management server, display a message indicating that a monitoring service could not be started.

8. A method executed in an image forming apparatus installed in a client system that is configured to communicate with a management server, the method comprising:
   transmitting a registration confirmation request that includes identification information of the image forming apparatus to the management server in response to an operation by a user for starting a monitoring service with the management server after the image forming apparatus is installed in the client system;
   analyzing a response from the management server to the registration confirmation request;
   starting transmission of information according to the monitoring service if an analysis result of the response indicates registration completion;
   storing a retry period included in the response if an analysis result of the response indicates non-registration; and
   retransmitting a registration confirmation request during the stored retry period until a response indicating registration completion is received from the management server.

9. A non-transitory computer readable storage medium on which is stored a computer program for making a computer execute a method for an image forming apparatus that is installed in a client system configured to communicate with a management server, the method comprising:
   transmitting a registration confirmation request that includes identification information of the image forming apparatus to the management server in response to an operation by a user for starting a monitoring service with the management server after the image forming apparatus is installed in the client system;
   analyzing a response from the management server to the registration confirmation request;
   starting transmission of information according to the monitoring service if an analysis result of the response indicates registration completion;
   storing a retry period included in the response if an analysis result of the response indicates non-registration; and
   retransmitting a registration confirmation request during the stored retry period until a response indicating registration completion is received from the management server.

* * * * *